US012465525B1

(12) United States Patent
Hoek et al.

(10) Patent No.: US 12,465,525 B1
(45) Date of Patent: Nov. 11, 2025

(54) WOUND COVERING WITH INFECTION INDICIUM

(71) Applicant: Health IQ Monitoring LLC, Annnapolis, MD (US)

(72) Inventors: Eric M.V. Hoek, Los Angeles, CA (US); M. Yashar S. Kalani, Tulsa, OK (US); Harvey L. Stein, Annapolis, MD (US)

(*) Notice: Subject to any disclaimer, the term of this patent is extended or adjusted under 35 U.S.C. 154(b) by 180 days.

(21) Appl. No.: 18/230,808

(22) Filed: Aug. 7, 2023

Related U.S. Application Data

(60) Provisional application No. 63/398,316, filed on Aug. 16, 2022.

(51) Int. Cl.
*A61F 13/00* (2024.01)
*A61F 13/0246* (2024.01)

(52) U.S. Cl.
CPC .... *A61F 13/00059* (2013.01); *A61F 13/0253* (2013.01); *A61F 2013/00889* (2013.01);
(Continued)

(58) Field of Classification Search
CPC ............... A61F 13/00; A61F 13/00008; A61F 13/00021; A61F 13/0206; A61F 13/023; A61F 13/0253; A61F 13/0266; A61F 13/0246; A61F 13/00063; A61F 2013/00089; A61F 2013/00634; A61F 2013/00757; A61F 2013/00953; A61F 5/443; A61K 9/70; A61L 31/146;
(Continued)

(56) References Cited

U.S. PATENT DOCUMENTS 5,204,110 A * 4/1993 Cartmell ................. A61L 15/26
424/443
6,706,279 B1 * 3/2004 Hazzi ..................... A61L 26/008
424/443
(Continued)

FOREIGN PATENT DOCUMENTS

KR   20120003231 U  *  5/2012  ............. A61F 13/02

OTHER PUBLICATIONS

Oriental Journal of Chemistry, Universal pH Indicator as a Colorimetric Reagent for Differentiating Inorganic Anions (Year: 2020).*
(Continued)

*Primary Examiner* — Alireza Nia
*Assistant Examiner* — Andrew Jun-Wai Mok
(74) *Attorney, Agent, or Firm* — Gugliotta & Gugliotta LPA

(57) ABSTRACT

A wound covering includes chemical sensor within a detecting temperature and pH at the skin surface. Changes in temperature and changes in pH at the wound surface are communicated by providing modifications to the visual indicia. The combination of either a change in temperature, a change in pH, or both provide a changing visual indicium that can communicate to the bandage wearer, or a medical caregiver, that a need to change the dressing and/or treating of the wound is in order. The visual indicia may be expressed as a change in color, or a change in the shade of a color that is located at or transmitted to the outer surface of the wound covering. The condition of a wound may be determined without the need to undress the wound for visual inspection.

19 Claims, 4 Drawing Sheets

(52) U.S. Cl.
CPC ............... *A61F 2013/00948* (2013.01); *A61F 2013/00953* (2013.01); *A61F 2013/00965* (2013.01)

(58) Field of Classification Search
CPC .......... A61L 15/00; A61L 15/44; A61L 26/00; A61L 26/0066; A61M 1/95; A61M 1/966
See application file for complete search history.

(56) References Cited

U.S. PATENT DOCUMENTS

| | | | | |
|---|---|---|---|---|
| 2008/0021429 | A1* | 1/2008 | Klofta | A61F 13/42 604/385.01 |
| 2013/0261409 | A1* | 10/2013 | Pathak | A61B 5/318 600/362 |
| 2018/0125722 | A1* | 5/2018 | Hoggarth | A61F 13/0289 |
| 2020/0340981 | A1* | 10/2020 | Hu | A61F 13/00051 |

OTHER PUBLICATIONS

PMC, Hydrogels as a Potential Biomaterial for Multimodal Therapeutic Applications (Year: 2024).*
RCSI—The Role of pH and Temperature as Biomarkers of Wound Healing (Year: 2022).*
Science Direct—Polyaniline nanoparticle based colorimetric sensor for monitoring bacterial growth (Year: 2015).*
The Wound Pros, Fever in Wound Management: Causes, Risks, and Treatment (Year: 2025).*
Zhang et al., Royal Society of Chemistry, A soft intelligent dressing with pH and temperature sensors for early detection of wound infectiont (Year: Jan. 25, 2022).*
Kim Intaek, Wound Dressing Using Water-Soluble Cellulose Ether (Year: 2012).*
https://www.alliedmarketresearch.com/US-hydrogel-dressing-market.
https://www.sciencedirect.com/topics/nursing-and-health-professions/hydrogel-dressing.
"Colorimetric paper-based analytical devices", Silva-Neto et al., Paper-Based Analytical Devices for Chemical Analysis and Diagnostics. 2022 Elsevier Inc.
"Universal pH Indicator as a Colorimetric Reagent for Differentiating Inorganic Anions", Rodrigo et al., Oriental Journal of Chemistry (Jun. 2020).
"Relative Temperature Maximum in Wound Infection and Inflammation as Compared with a Control Subject Using Long-Wave Infrared Thermograph", Chanmugam et al., Advances in Skin.
"Burns", Ono et al., vol. 41, 2015, 820-824.
https://knowledge.carolina.com/physical-science/chemistry/measuring-ph/.

* cited by examiner acid ionization base hydrolysis

WOUND COVERING WITH INFECTION INDICIUM

RELATED APPLICATIONS

The present invention claims benefit to U.S. Ser. No. 63/398,316, filed on 16 Aug. 2022, and incorporated by reference as if fully rewritten herein.

BACKGROUND OF THE INVENTION

1. Field of the Invention

The present invention relates generally to wound dressings and bandages and system and, more particularly, to such a wound dressing that provides an identifiable indicium to indicate an infection of a wound.

2. Description of the Related Art

A "dressing" is a sterile pad or compress in direct contact with the wound, as distinguished from a bandage, which is most often used to hold a dressing in place. Many modern dressings are self-adhesive, thus combining the function such that "wound dressing" and "bandage" may be often used interchangeably to describe a covering to promote healing and protect a wound.

In addition to generally promoting healing and providing protection, dressings and bandages, depending on the type, severity and position of the wound, the purposes of a dressing are:
  Stem bleeding—to help to seal the wound to expedite the clotting process;
  Protection from infection—to defend the wound against germs and mechanical damage;
  Absorb exudate—to soak up blood, plasma, and other fluids exuded from the wound, containing it/them in one place and preventing maceration;
  Ease pain—either by a medicated analgesic effect, compression or simply preventing pain from further trauma;
  Debride the wound—to remove slough and foreign objects from the wound to expedite healing;
  Reduce psychological stress—to obscure the wound from the view of the patient and others.
Ultimately, by reducing the risk of infection a wound can heal more quickly.

However, while reduction of the risk of infection is the norm, by obscuring the wound from view medical caregivers are also prevented from quickly identifying the early signs of infection.

One recent innovation, referred to as a 'smart bandage' contains a sensor that can accurately measure moisture levels then transmit the data to a smartphone. Such devices use bandage-compatible RFID tag, similar to those used for clothing security tags, incorporated into a textile patch in order to wirelessly communicate moisture level data with a smartphone, allowing healthcare staff to know when a bandage needs to be changed.

However, such an "Internet of Things" solution is technological and functional overkill, resulting in unnecessary cost and functionality, as well as being useless in many emergency situations and throughout most parts of the world. Consequently, a need exists for an improved bandage that can provide a simple, inexpensively created indicia in a manner that may be incorporated into many or most existing conventional bandage and dressing designs.

SUMMARY OF THE INVENTION

It is thus an object of the present invention to provide a wound covering that incorporates an indicator related the presence of an increasing infection.

It is a feature of the present invention to provide a visual indicium generated from changes in pH and/or temperature.

The present invention provides for the monitoring of wounds for infection by providing a low-cost wearable chemical sensor within the dressing that can detect temperature and pH at the skin surface. Changes in temperature at the wound surface are communicated by providing a visual indicium that changes with the temperatures of at the point of contact. Further, changes in pH at the wound surface is communicated by providing modifications to the visual indicia that changes with the acidity at the point of contact of the inner surface of the wound covering. The combination of either a change in temperature, a change in pH, or both provide a changing visual indicium that can communicate to the bandage wearer, or a medical caregiver, that a need to change the dressing and/or treating of the wound is in order.

The visual indicia may be expressed as a change in color, or a change in the shade of a color that is located at or transmitted to the outer surface of the wound covering. In this manner, patients can themselves monitor the condition of their wounds without requiring the physical presence of medical staff to periodically inspect the wound. Similarly, medical staff can quickly and easily determine the status of the wound without the need to undress the wound for visual inspection. Such optimization of the would covering's functional life may also minimize the need for medical personnel intervention.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
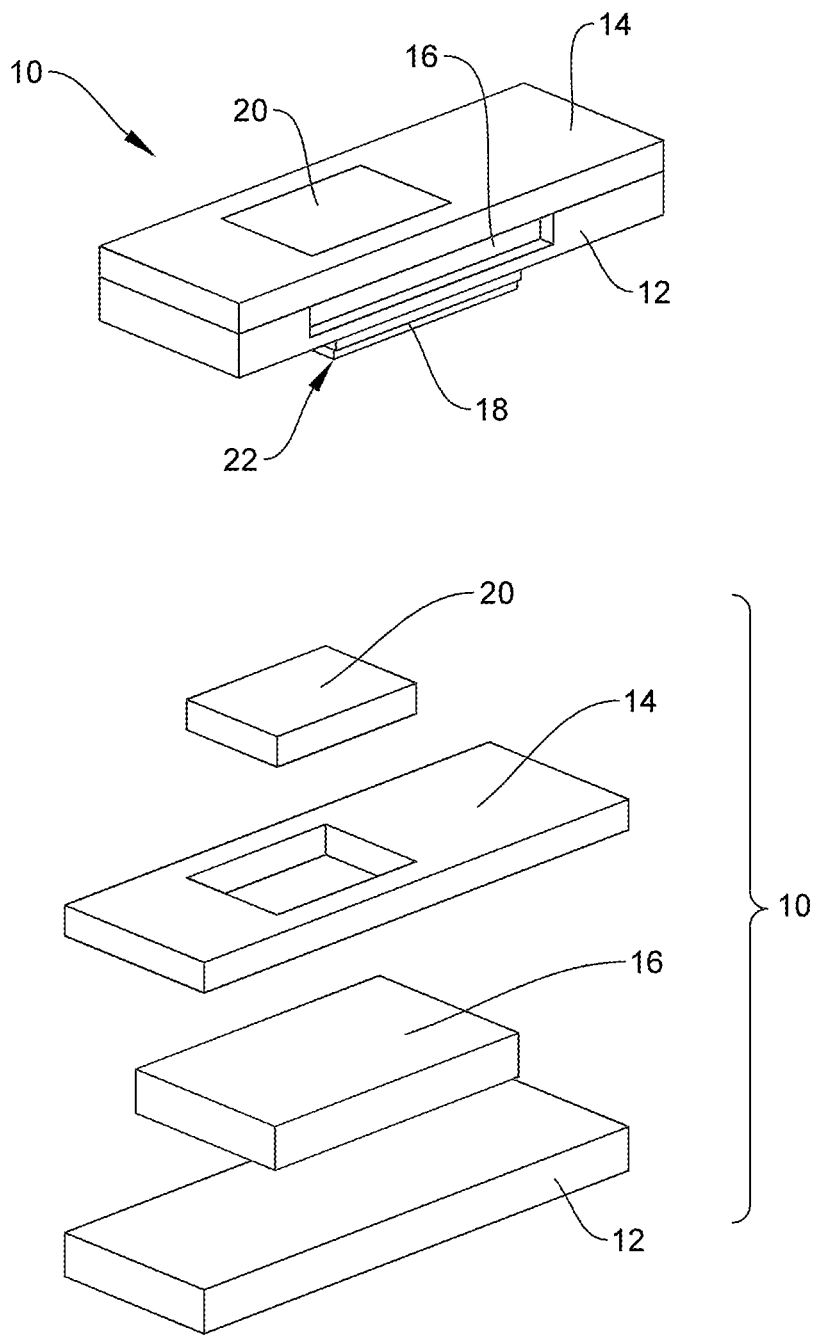
FIG. 1 is an exploded perspective view depicting an improved wound covering according to the preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present disclosure the terms "wound cover", "bandage", "wound dressing" and "dressing" should be broadly considered to be interchangeable, to the extent that the improvements described and claimed herein may be applied by others skilled in the art to be incorporated in conjunction with any functionally similar or equivalent covering for any type of wound. It should also be understood that such terms are not intended to limit the or be interpreted to be limited in scope based on any statement made in any section of this patent (other than the language of the claims). Further, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a wound covering, generally noted as 10, is shown according to the preferred embodiment of the present invention. The wound covering 10 may include: an inner layer 12; an outer layer 14; a central layer 16; a contacting surface 18; and an indicator surface.

The inner layer may provide a sponge like layer of gauze or similar or equivalent material that provides for absorption of wound exudate. The inner layer may further provide for water evaporation.

The outer layer may function to secure the covering over a wound, including an adhesive at a proximal surface and supporting an indicia mechanism at the distal surface. The outer layer may be made of coated paper, a woven fabric, plastic (PVC, polyethylene or polyurethane), or latex strip. It may or may not be waterproof; if it is airtight, the bandage is an occlusive dressing. An adhesive such as an acrylate, including methacrylates and epoxy diacrylates may provide an attachment of the outer layer over a wound. It should be apparent to those having ordinary skill in the relevant art, in light of the present teachings, that many functionally equivalent variations and substitutions for the outer layer may exist without compromising the efficacy and functionality of the present invention and, as such, such variations and substitutions should be interpreted within the scope of the present invention.

The central layer comprises an absorbent pad. The absorbent pad may be made of cotton. In an alternate configuration, the pad may also be medicated with an antiseptic solution. In yet another configuration, the pad may be formed of a water-absorbing hydrogel.

The contacting surface may include a thin, porous-polymer coating over a proximal surface of the central layer to provide a non-stick surface preventing the disruption of the wound when removed. According to a preferred embodiment, the coating for the contacting surface may be semi-occlusive and composed of complex hydrophilic polymers with a high (90%) water content. According to a more preferred embodiment, the coating for the contacting surface may include a hydrogel of polymethylmethacrylate, polyvinylpyrrolidone, polyvinyl alcohol, polyethylene glycol, or polypropylene glycol, either cross-linked or amorphous. Such a hydrogel may further be impregnated with wound healing and/or scar reducing vitamins. The contacting surface further supports the indicator surface.

The indicator surface incorporates a sensor indicator that monitors a wound for infection by detecting temperature and pH at the skin surface. It is preferred that a combination of either a change in temperature, a change in pH, or both are utilized to provide a changing visual indicium that can communicate to the bandage wearer, or a medical caregiver, that a need to change the dressing and/or treating of the wound is in order.

Figure 4:
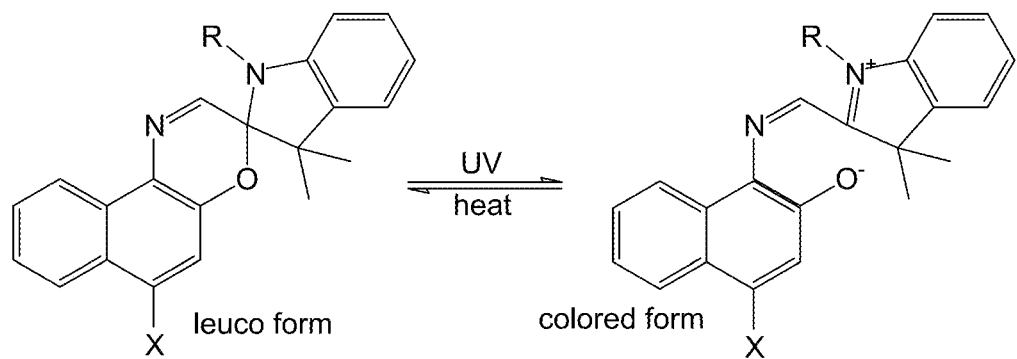
FIG. 4 is a diagram depicting a chemical formula for a leuco dye color change reaction for use therewith.
Figure 5:
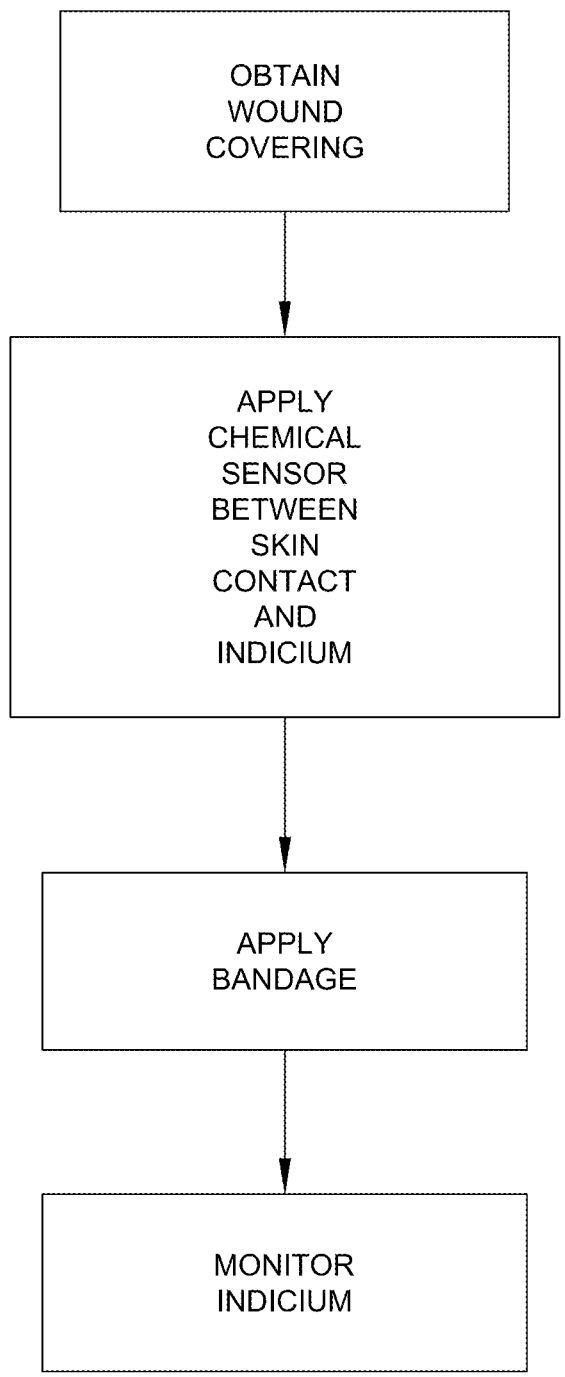
FIG. 5 is a schematic view thereof depicting, generally, a method of use in determining an increasing risk of wound infection.

By way of example, and not meant as a limitation, temperature change may be indicated using a thermochromic system including at least two chemical components: a leuco dye; and, a color developer. As shown in FIG. 4, the leuco dyes, which are weak organic bases, change from colored to colorless (clear) upon heating and normally function over a 5 to 15° C. temperature range. Changing temperature shifts the equilibrium between the colored or protonated form of the dye, where the proton is generally donated by the color developer (e.g., a weak acid) and the unprotonated or colorless form.

Leuco dyes used herein may include spirolactones such as fluorans or crystal violet lactone, spiropyrans, fulgides, and the like. An elevation of temperature may be visually identified as evidenced by a maximum temperature differential between the wound and healthy skin of +4 to 5° C. where a normal control subject without diagnosis of infection or signs of inflammation exhibits relative temperature differentials of +1.1 to 1.2° C. By incorporating leuco dye-based thermochromic inks as colored in a non-heated state (below their activation temperature) and become clear or slightly colored in a heated state (above their activation temperature), a wound infection indication may be activated by detecting such a temperature differential. Further still, such a thermochromic ink system may also be blended with additional, non-heat sensitive pigments, in order to allow a visual change from one color to another.

A wide range of leuco dye-based thermochromic inks are available, such as solvent-based, water-based, UV cured, epoxy, etc., and are used for printing on textiles, plastic, paper and metal. In the instant application, the leuco dye-based thermochromic ink may be printed over the indicator surface to form the sensor indicator. It is preferred that the thermochromic ink be produced in a color other than white, and that in such an application the indicator surface is preferably a light background and, more preferably, a white background in order to prevent a background color form effecting a color of the ink in both the non-heated and heated state. In a more preferred embodiment, the leuco dye-based thermochromic ink may be provide di a magenta, black, blue, turquoise or orange color.

In any configurations, changes in temperature at the wound surface is communicated by providing a visual indicium that changes with the temperatures of at the point of contact. Preferably, the visual indicium utilizes a chemical reaction to identify early detection of bacterial infection in a healing wound. With the outer layer providing a physical barrier to cover a wound and provide a sampling of the wound milieu for detection of microbial signatures signifying infection of the wound. By utilizing a combination of presence of fever, an acidic environment, and presence of IL-1ß as a marker of severe inflammation, such chemical reactions correlate with infection. Colorimetric change allows for ease of identification of an early infected wound and intervention to prevent further development of infection and or abscess.

Further, it is also known that wound pH affects a number of important factors in wound healing. It is known that the pH of the skin surface of healthy adults and children is 4.2-5.6 and that it decreases with the lapse of epithelialization. By way of additional example, Ono et al. [ref FF] measured the pH of the exudates from second degree burns in 26 cases. Among these, local burn wound infection developed in 6 cases. The causative organisms were *Staphylococcus aureus* in 2 cases and *Staphylococcus epidermidis* in 4 cases. The maximum pH value measured was 10.0 and the minimum was 5.0 for all samples. There were no differences in the initial measurements of pH between the non-infected cases and the local-infected cases. In cases of local infection, the pH rose prior to the onset of clinical signs of local burn infection. By consecutive measurement of pH, early detection of local wound infection can be achieved, thereby being very beneficial in clinical practice.

Changes in pH at the wound surface may be communicated by providing modifications to the visual indicia that changes with the acidity at the point of contact of the inner surface of the wound covering. pH is a measure of the concentration of hydronium ($H_3O^+$) ions in an aqueous solution. It is measured on a negative logarithmic scale from 0 to 14. Acidic solutions are below pH 7, with 0 being the most acidic. Basic solutions are above pH 7, with 14 being the most basic. A solution with a pH of 7 is considered neutral. An example of a neutral solution is pure water at room temperature.

Many methods of testing for pH exist, include testing. They include chemistry titrations, liquid pH indicators, pH test papers, and pH meters. Liquid acid-base may be used as indicators of weak organic acids or bases. These may be presented as different colors in their acid and base forms. In a preferred embodiment such an indicator would be functional over a specific pH range over which it changes from its acid form to its base form. These may include phenolphthalein (range pH 8.2 to 10.0; colorless to pink), bromothymol blue (range pH 6.0 to 7.6; yellow to blue), and litmus (range pH 4.5 to 8.3; red to blue). In an alternate embodiment a universal indicator may be provided using a are mixtures of several different pH indicators that extend the pH range over which they operate. One such indicator may include a Bogen universal indicator which provides a mixture of methyl red, bromothymol blue, and phenolphthalein, and indicates on a wide pH range of 4.0 to 10.0 in discrete color steps.

It is preferred that a pH indicator using a "single" reagent is provided for differentiating anions, and more preferably color changes are indicated by detection of halides using $F^-$, $Cl^-$, $Br^-$, and $I^-$, which have colors similar in solutions at 0.1M concentration. At a higher concentration, such as 1M, $F^-$ is still significantly different, with an increase in ionic strength of halide solutions which causing shift in the color of the indicator.

Figure 2:
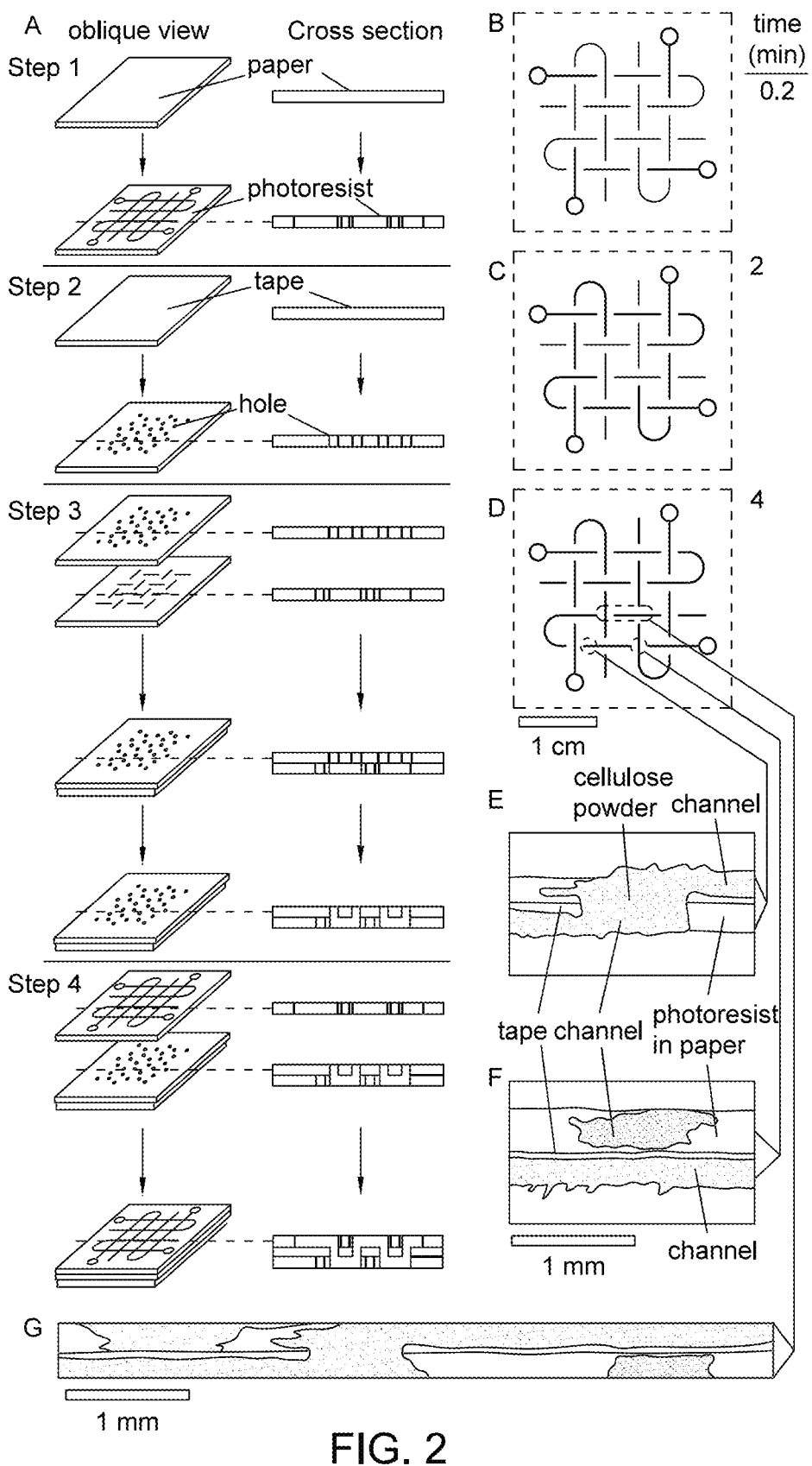
FIG. 2 is a diagram depicting a patterned, stacked structure of a detection indicator use therewith.
Figure 3:
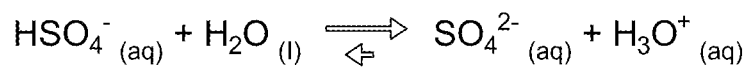
FIG. 3 is a diagram depicting the acid ionization and base hydrolysis reactions for a typical pH indicator reaction for use therewith.
Figure 3:
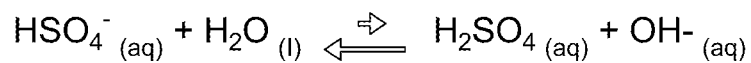

In an alternate configuration, a Litmus paper may be incorporated for identification of pH. In such a configuration it is preferred that a precise pH test paper or strip be utilized to allow for testing results down to 0.2 pH units. As shown in conjunction with FIG. 2, the detection indicator may be fabricated through a multilayer stacking process comprising alternating patterned layers of paper and water-impermeable double-sided adhesive tape, arranged to channel the flow of fluid within and between the layers. In Step 1, a base layer of pattern paper is processed with photoresist to define fluid-conductive channels. In Step 2, a sheet of patterned adhesive tape is prepared with through-holes designed to serve as vertical conduits between paper layers. These holes are spatially aligned to enable selective transfer of fluid from one channel to the next. In Step 3, the patterned tape is adhered to the bottom layer of patterned paper, creating sealed regions except at the defined transfer ports. The holes within the tape are then filled with cellulose powder, which serves as a hydrophilic medium facilitating capillary action. In Step 4, a top layer of patterned paper is laminated to the upper surface of the adhesive tape, completing the microfluidic matrix. The cellulose powder bridges the vertical flow paths and enables controlled wicking between paper layers. Collectively, this layered structure defines an integrated fluidic network in which reagents or wound exudate may be laterally and vertically distributed in a controlled fashion, thereby facilitating the localized presentation of a visual indicium responsive to changes in temperature or pH at the skin-contacting surface of the wound covering.

According to another aspect, an additive, such as polyaniline, may be used as a pH responsive polymer:

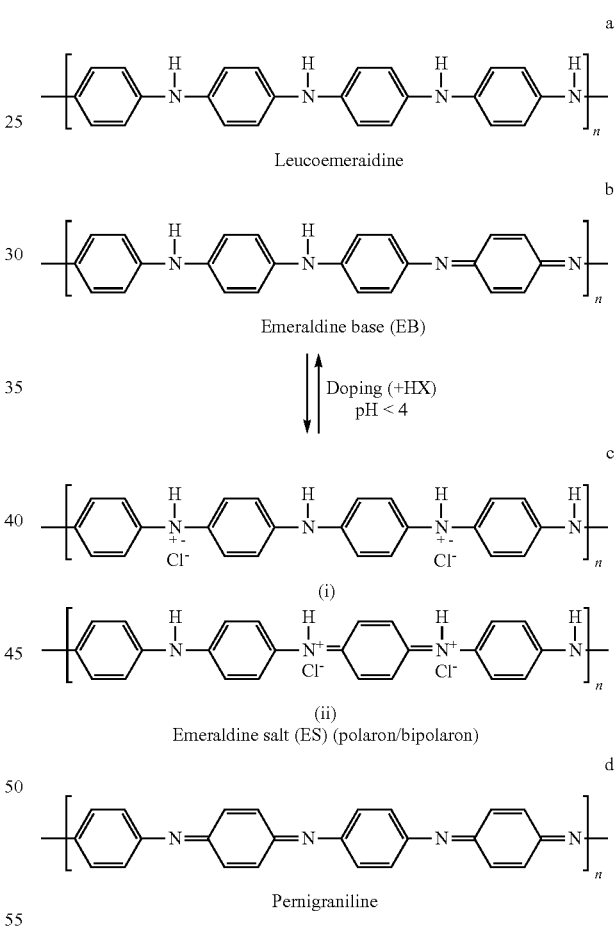

The "de-doped" Emeraldine base form, having a dark blue color upon first exposure to healthy skin, which is about pH 4-5, and will become partially "doped" and turn blue-green. If it is exposed to infectious bacteria it would respond to an increase in skin pH by "de-doping" and turning back into the dark blue color of the Emeraldine base form. Being structurally like the N-terminus of a protein, such an additive is biocompatible with human blood.

According to additional embodiments, the pH-responsive additive, such as polyaniline, may be incorporated in various configurations within the wound covering. In one configuration, the polyaniline is incorporated into a separate layer within the contacting surface, allowing the pH-responsive properties to be in direct contact with the wound while maintaining the non-stick properties of the contacting surface. In another configuration, the polyaniline is selectively dispersed within microcapsules or microspheres 22 distributed in the contacting surface or central layer, allowing localized color changes in response to pH variations at specific areas of the wound. This selective dispersion enables more precise monitoring of infection development across the wound surface. In yet another configuration, the pH-responsive additive is distributed throughout the central layer, with its color change due to pH variation visible through the indicator surface or a transparent region in the wound covering, providing a broader indication of the overall wound environment.

2. Operation of the Preferred Embodiment

In operation, monitoring wound temperature is achieved by applying thermochromic paint in a pattern such that when the temperature and/or pH exceeds a threshold value a color change occurs or such that the color directly indicates the temperature of the wound. The thermochromic paint is preferably in thermal and/or chemical communication through the inner surface 16 whereby the indicium can be generated at the indicator surface 20. Diagnostic pH detection may further be provided by facilitating movement of wound fluids across pH indicator paper strips to distribute reagents over a paper patterned into hydrophilic channels and hydrophobic walls and tape patterned with holes that connect channels in different layers of paper. These structures distribute fluids both vertically and laterally, and they enable streams of fluid to cross one another without mixing. Using capillary wicking to distribute fluids into complex arrays of tens to thousands of detection zones in times of seconds to minutes (depending on the architecture of the device, and the choice of materials).

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching.

The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 U.S. 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

We claim:

1. A wound covering comprising:
   an inner layer designed for absorbing wound exudate and facilitating water evaporation;
   an outer layer with a proximal surface having an adhesive for securing the wound covering over a wound, and a distal surface supporting an indicia mechanism;
   a central layer incorporating an absorbent pad made of cotton or a water-absorbing hydrogel;
   a contacting surface having a thin, porous-polymer coating on a proximal surface of the central layer to provide a non-stick surface preventing disruption of the wound when removed; and
   an indicator surface incorporating a sensor indicator comprising a pH-responsive additive capable of monitoring a wound for infection by detecting temperature and pH at a skin surface, wherein the pH-responsive additive, polyaniline, is incorporated into a separate layer within the contacting surface, and its color change due to pH variation is visible through the indicator surface or a transparent region in the wound covering.

2. The wound covering of claim 1, wherein the indicator surface incorporates a pH indicator system capable of detecting changes in pH and indicating pH values over a specific range.

3. The wound covering of claim 2, wherein the pH indicator system differentiates anions and indicates color changes caused by halides (F−, Cl−, Br−, and I−) at a higher concentration of 1M.

4. The wound covering of claim 1, further comprising the pH-responsive additive integrated into the contacting surface or central layer, said pH-responsive additive comprising a "de-doped" Emeraldine base form, exhibiting a dark blue color upon initial exposure to healthy skin at a pH of about 4-5 that, when exposed to infectious bacteria, the pH-responsive additive responds to an increase in skin pH by "de-doping" and transitioning to a blue-green color to provide an indication of the wound's infection status.

5. The wound covering of claim 4, wherein the pH-responsive additive, polyaniline, structurally resembles a N-terminus of a protein, ensuring biocompatibility with human blood and minimizing adverse reactions in users.

6. The wound covering of claim 4, wherein the pH-responsive additive is distributed throughout the central layer, and its color change due to pH variation is visible through the indicator surface or a transparent region in the wound covering.

7. A method of detecting wound infection using the wound covering of claim 1, comprising:
   a) applying the wound covering over a wound, such that the contacting surface (18) is in direct contact with the wound surface;

b) observing color changes in the pH-responsive additive, polyaniline, visible through the indicator surface or a transparent region in the wound covering;

c) correlating the observed color changes with infection status, wherein a return to a dark blue color of the Emeraldine base form indicates wound infection due to an increase in skin pH.

8. The method of claim 7, wherein the wound covering further includes a thermochromic system, and temperature changes are also observed and correlated with infection status through visual indications visible on the indicator surface.

9. The method of claim 7, wherein the wound covering further includes a pH indicator system, and changes in pH are observed and correlated with infection status through visual indications visible on the indicator surface.

10. The wound covering of claim 1, wherein the outer layer is made of coated paper, woven fabric, PVC, polyethylene, polyurethane, or latex strip.

11. The wound covering of claim 1, wherein the outer layer is waterproof and acts as an occlusive dressing.

12. The wound covering of claim 1, wherein the adhesive of the outer layer is an acrylate adhesive, including methacrylates and epoxy diacrylates.

13. The wound covering of claim 1, wherein the contacting surface has a semi-occlusive coating composed of complex hydrophilic polymers with a high-water content.

14. The wound covering of claim 1, wherein the contacting surface has a hydrogel coating of polymethylmethacrylate, polyvinylpyrrolidone, polyvinyl alcohol, polyethylene glycol, or polypropylene glycol, either cross-linked or amorphous, and impregnated with wound healing and/or scar reducing vitamins.

15. The wound covering of claim 1, wherein the indicator surface incorporates a thermochromic system with leuco dyes that change color from colored to colorless upon heating within a 5 to 15° C. temperature range.

16. The wound covering of claim 1, wherein the indicator surface utilizes a chemical reaction to identify early detection of bacterial infection in a healing wound by correlating changes in temperature and pH with infection markers for the presence of fever, an acidic environment, and IL-1ß.

17. The wound covering of claim 1, wherein the pH-responsive additive, polyaniline, is selectively dispersed within microcapsules or microspheres distributed in the contacting surface or central layer, allowing localized color changes in response to pH variations at specific areas of the wound.

18. The wound covering of claim 1, wherein the indicator surface further includes a visual display or indicator mechanism that communicates a color change of the pH-responsive additive, polyaniline, to users, indicating infection status without a need for external equipment or measurements.

19. The wound covering of claim 1, wherein the sensor indicator on the indicator surface is capable of providing a simultaneous indication of both temperature and pH changes at a wound surface, facilitating comprehensive wound monitoring for infection detection.

* * * * *